(12) United States Patent
Bauer et al.

(10) Patent No.: US 7,392,224 B1
(45) Date of Patent: Jun. 24, 2008

(54) SYSTEM AND METHOD OF OPERATING A DEBIT CARD REWARD PROGRAM

(75) Inventors: James L. Bauer, Bridgehampton, NY (US); Margaret Masella, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/397,309

(22) Filed: Sep. 16, 1999

Related U.S. Application Data

(60) Provisional application No. 60/130,830, filed on Apr. 23, 1999.

(51) Int. Cl.
*G06Q 40/00* (2006.01)

(52) U.S. Cl. .............................. 705/41; 705/36; 705/35; 705/26

(58) Field of Classification Search .................. 705/41, 705/37, 36, 35, 38, 26, 34; 379/144, 111, 379/114; 709/203, 200, 217
See application file for complete search history.

(56) References Cited

U.S. PATENT DOCUMENTS

| | | | |
|---|---|---|---|
| 4,630,844 A | 12/1986 | Troy et al. |
| 4,637,634 A | 1/1987 | Troy et al. |
| 4,723,212 A | 2/1988 | Mindrum et al. |
| 4,750,119 A | 6/1988 | Cohen et al. |
| 4,825,045 A | 4/1989 | Humble |
| 4,833,308 A | 5/1989 | Humble |
| 4,833,607 A | 5/1989 | Dethloff et al. |
| 4,885,685 A | 12/1989 | Wolfberg et al. |
| 4,906,826 A | 3/1990 | Spencer |
| 4,908,761 A | 3/1990 | Tai |
| 4,910,672 A | 3/1990 | Off et al. |
| 4,932,485 A | 6/1990 | Mori |
| 4,941,090 A | 7/1990 | McCarthy |
| 4,982,346 A | 1/1991 | Girouard et al. |
| 5,007,641 A | 4/1991 | Seidman |
| 5,025,372 A | 6/1991 | Burton et al. |
| 5,056,019 A | 10/1991 | Schultz et al. |
| 5,080,364 A | 1/1992 | Seidman |
| 5,085,435 A | 2/1992 | Rossides |
| 5,117,355 A | 5/1992 | McCarthy |

(Continued)

OTHER PUBLICATIONS

New York—(Business Wire)—Apr. 23, 1999—@Work Technologies, Inc., a leading provider of Electronic Bill to Internet Bill Presentment Software form@ Work Technology; Leading Australian Service Provider to LeverageWorkOut for e-Bills Service; Business /High -Tec Editors. Business Wire. New York: Apr. 23, 1999. p. 1InNew York Business Wire)—Ap.*

*Primary Examiner*—Frantzy Poinvil
*Assistant Examiner*—Clement Graham
(74) *Attorney, Agent, or Firm*—Goodwin Procter LLP

(57) ABSTRACT

A system and a method of operating a debit card reward program that generates a reward for the cardholder based upon purchases made with the debit card. This reward amount may be applied to subsequent purchases made by the cardholder with the debit card. Additionally, all or a portion of the reward amount may be delivered to a sponsor, such as a charitable institution. A reward is accrued for every purchase conducted at any merchant made using the debit card. In particular, this reward is a varied percentage of every debit card purchase and may result in an additional reward for purchases that meet selected criteria.

101 Claims, 7 Drawing Sheets

U.S. PATENT DOCUMENTS

| | | |
|---|---|---|
| 5,173,851 A | 12/1992 | Off et al. |
| 5,179,517 A | 1/1993 | Sarbin et al. |
| 5,200,889 A | 4/1993 | Mori |
| 5,201,010 A | 4/1993 | Deaton et al. |
| 5,202,826 A | 4/1993 | McCarthy |
| 5,231,568 A | 7/1993 | Cohen et al. |
| 5,233,514 A | 8/1993 | Ayyoubi et al. |
| 5,269,521 A | 12/1993 | Rossides |
| 5,287,268 A | 2/1994 | McCarthy |
| 5,293,310 A | 3/1994 | Carroll et al. |
| 5,297,026 A | 3/1994 | Hoffman |
| 5,353,218 A | 10/1994 | De Lapa et al. |
| 5,368,129 A | 11/1994 | Von Kohorn |
| 5,373,440 A | 12/1994 | Cohen et al. |
| 5,380,991 A | 1/1995 | Valencia et al. |
| 5,388,165 A | 2/1995 | Deaton et al. |
| 5,430,644 A | 7/1995 | Deaton et al. |
| 5,448,471 A | 9/1995 | Deaton et al. |
| 5,450,938 A | 9/1995 | Rademacher |
| 5,459,306 A | 10/1995 | Stein et al. |
| 5,466,919 A | 11/1995 | Hovakimian |
| 5,467,269 A | 11/1995 | Flaten |
| 5,472,196 A | 12/1995 | Rusnak |
| 5,481,094 A | 1/1996 | Suda |
| 5,483,049 A | 1/1996 | Schulze, Jr. |
| 5,491,326 A | 2/1996 | Marceau et al. |
| 5,504,808 A | 4/1996 | Hamrick, Jr. |
| 5,512,270 A | 4/1996 | Ghio et al. |
| 5,513,102 A | 4/1996 | Auriemma |
| 5,515,270 A | 5/1996 | Weinblatt |
| 5,537,314 A | 7/1996 | Kanter |
| 5,555,497 A | 9/1996 | Helbling |
| 5,580,309 A | 12/1996 | Piechowiak et al. |
| 5,588,649 A | 12/1996 | Blumberg et al. |
| 5,592,560 A | 1/1997 | Deaton et al. |
| 5,612,868 A | 3/1997 | Off et al. |
| 5,620,182 A | 4/1997 | Rossides |
| 5,621,812 A | 4/1997 | Deaton et al. |
| 5,638,457 A | 6/1997 | Deaton et al. |
| 5,642,279 A | 6/1997 | Bloomberg et al. |
| 5,642,485 A | 6/1997 | Deaton et al. |
| 5,644,723 A | 7/1997 | Deaton et al. |
| 5,649,114 A | 7/1997 | Deaton et al. |
| 5,659,469 A | 8/1997 | Deaton et al. |
| 5,663,547 A | 9/1997 | Ziarno |
| 5,665,952 A | 9/1997 | Ziarno |
| 5,687,322 A | 11/1997 | Deaton et al. |
| 5,689,100 A | 11/1997 | Carrithers et al. |
| 5,696,366 A | 12/1997 | Ziarno |
| 5,708,782 A | 1/1998 | Larson et al. |
| 5,717,866 A | 2/1998 | Naftger |
| 5,727,153 A | 3/1998 | Powell |
| 5,729,693 A | 3/1998 | Holda-Fleck |
| 5,734,838 A | 3/1998 | Robinson et al. |
| 5,741,183 A | 4/1998 | Acres et al. |
| 5,749,075 A | 5/1998 | Toader et al. |
| 5,752,882 A | 5/1998 | Acres et al. |
| 5,761,647 A | 6/1998 | Boushy |
| 5,774,870 A | 6/1998 | Storey |
| 5,774,884 A | 6/1998 | Watanabe et al. |
| 5,781,894 A | 7/1998 | Petrecca et al. |
| 5,794,964 A | 8/1998 | Jones et al. |
| 5,795,225 A | 8/1998 | Jones et al. |
| 5,806,045 A | 9/1998 | Biorge et al. |
| 5,822,735 A | 10/1998 | De Lapa et al. |
| 5,945,653 A * | 8/1999 | Walker et al. ............... 235/380 |
| 6,047,268 A * | 4/2000 | Bartoli et al. ................. 705/35 |
| 6,222,914 B1 * | 4/2001 | McMullin .............. 379/144.01 |
| 6,397,198 B1 * | 5/2002 | Hoffman et al. .............. 705/44 |
| 6,757,710 B2 * | 6/2004 | Reed .......................... 709/203 |
| 6,999,569 B2 | 2/2006 | Risafi et al. |
| 7,104,443 B1 | 9/2006 | Paul et al. |
| 2002/0194081 A1 * | 12/2002 | Perkowski ................... 705/26 |

* cited by examiner

John Doe
123 Main Street
Anytown, USA

Beginning balance..................................................................$___
Deposits...............................................................................$___
Withdrawals.........................................................................$___
Ending balance....................................................................$___

[WHAT SORT OF DETAILS WILL BE PROVIDED?]

| Free Goods or Services from Participating Merchant Previously Earned | Free Goods or Services from Participating Merchant Redeemed this Period | Free Product or Service Earned this Period | Free Product or Service Available to be Redeemed | Total Earned Since Date | Free Product or Service Expiring on Date |
|---|---|---|---|---|---|
| $10.76 | $10.76 | $5.29 | $5.29 | $328.24 | $5.29 |

SYSTEM AND METHOD OF OPERATING A DEBIT CARD REWARD PROGRAM

CROSS-REFERENCE TO RELATED APPLICATIONS

This patent application claims priority to U.S. Provisional Patent Application No. 60/130,830, filed Apr. 23, 1999, which is hereby incorporated by reference herein in its entirety.

FIELD OF THE INVENTION

The invention is related to the field of debit cards. In particular, the invention is directed to a system and a method of operating a debit card reward program that generates a reward for the cardholder based upon purchases made with the debit card. This reward amount may be applied to subsequent purchases made by the cardholder with the debit card. Additionally, all or a portion of the reward amount may be delivered to a sponsor, such as a charitable institution.

BACKGROUND OF THE INVENTION

Debit cards (also known as "check cards" or "deferred debit cards") are one of the fastest-growing methods of payments for consumers and small businesses, supplementing and replacing payments made via cash, check or credit card. Debit cards are issued by financial institutions in conjunction with a variety of deposit accounts offered by those financial institutions. These financial accounts include demand deposit accounts, checking accounts, savings accounts, share draft accounts, money market accounts, cash or investment management accounts, and the like. (For the purposes of this application, such accounts will be referred to herein generally as "financial accounts.") When the cardholder presents the debit card at a merchant to make a purchase, the amount is debited from the financial account either immediately, or within about 1-2 days (as opposed to a credit card, which is billed periodically to the cardholder). Like a credit card, however, the debit card may be employed to make payments at retail establishments, for periodic bills, for on-line, Internet or telephone purchases, etc. Further, the cardholder can use the debit card to perform a number of functions including: withdrawing cash from an Automated Teller Machine, or other electronic devices such as point of banking terminals, as an identification device when conducting a financial transaction at a bank, merchant or other location and to receive cash back as part of a point of sale purchase.

Debit card transactions can be administered in two ways: on-line processing or off-line processing. Off-line processing is similar to traditional credit card processing. Data concerning the transaction, including the identity of the financial institution (i.e., the card issuer), the cardholder identification information, merchant identification information, product information and value information, is transmitted over existing credit card clearance networks, such as MasterCard or Visa. However, unlike a credit card, the payment to the credit card clearinghouse is made relatively promptly (within a few days) by the financial institution.

Alternatively, the debit card transaction may be processed "on-line." Such on-line processing has historically been used for cash withdrawals from automatic teller machines. In the case of a debit card purchase, the merchant, using an automated terminal connected to an ATM "switch" confirms that there are sufficient funds in the financial account to cover the purchase. An on-line debit to the account is posted or a hold is placed on these funds. Unlike credit card purchases and other off-line purchases, no information regarding the purchase, other than the merchant identification and the purchase amount, is generally recorded.

The debit cards provide consumers with a more convenient and lower-cost method of purchasing goods and services. For consumers, information on purchases can be tracked on the financial account statement. For financial institutions, debit card transactions cost less to process than checks and provide information on the purchase transaction and the cardholder. Such information can be used in a variety of ways including: developing analytical and marketing programs about the cardholder, the purchases and the merchant. For merchants, debit card payments increase the range of payment options available to consumers, and can provide a lower cost and more secure method for accepting payments over cash, checks and in many instances, credit cards. Debit cards can also provide information about cardholder purchase behavior, and provide the ability to extend the financial institution's branding and marketing efforts through co-branding arrangements with various partners and sponsors.

SUMMARY OF THE INVENTION

One embodiment of the instant invention relates to a method and system for operating a loyalty/rewards program using a debit card. Debit cards are issued to customers (now "cardholders" or "users") by a financial institution (either independently or in conjunction with one or more participating organizations). At the point of sale, information concerning the purchase made with the debit card is electronically captured. This information may include the identity of the merchant making the sale, the manufacturer of the goods sold, the type of goods sold, the amount of the sale, and the date and time of the sale. This information is then compared to predetermined criteria which has been stored in a computer. If the cardholder, merchant, manufacturer, type of goods, amount of sale, date and time of sale, or any combination thereof meet the criteria, a reward is accrued. The accrued reward is thereafter delivered, using various possible delivery mechanisms.

In one implementation of this embodiment of the invention, the cardholder is issued the debit card in conjunction with opening a financial account. This card may be used as a traditional debit card to make purchases, withdraw cash from an ATM, get cash back at point of sale, and so on. The debit card of the invention is used in conjunction with existing transaction networks that support on-line and off-line debit transactions and with all merchants who are capable of accepting payments from consumers using a debit card. A reward is accrued for every purchase conducted at any merchant made using the debit card. In particular, this reward is a percentage of every debit card purchase. An additional reward is accrued for purchases of selected goods at one or more selected merchant or for purchases that meet selected criteria. In particular, a higher percentage of the debit card purchases of these selected goods is accrued as the reward. The total rewards may be enjoyed by the cardholder by purchasing goods at a future visit to the selected merchant. In particular, when the cardholder makes a purchase, the financial account is debited for the full value of the purchase. A reward is then credited to the financial account (up to an amount equal to the value of the purchase but not exceeding the value of the debit card holder's accrued reward), effectively providing a rebate on the purchase.

In another implementation of this embodiment of the invention, the financial institution cooperates with a partner or "sponsor" to define and operate the reward program. The partner may be a merchant, a manufacturer of goods, a service provider, a charitable organization, or any other such institution that can derive benefit from a directed use of the debit card. The reward accrued by the cardholder may be based, at least in part, on activities that advance the interest of the partner. Additionally, the reward may be defined such that it is redeemable in a manner that advances the interest of the partner. For example, in the case of a merchant partner who desires to increase sales of a particular type of goods, an increased reward may be accrued for purchases of the selected goods at that merchant. The reward may be redeemable (as a rebate credited to the financial account) only by purchasing those selected goods at a future time. Consequently, the cardholder is encouraged to use the debit card to purchase the selected goods and accrue the reward. Further, the cardholder must use the debit card later to obtain the rebate.

The loyalty/rewards program may include additional functionality to encourage frequent use of the debit card. Additional partners may join the program, providing a reward for a broader spectrum of goods and services. A partner may define a theme that is consistent with that partner's business plan or mission, such as a "healthy lifestyle" theme for a health advocacy organization. Rewards may be accrued based upon the purchase of certain thematic goods and services, such as healthy foods, health club memberships and exercise equipment. These rewards may be delivered to the cardholder as a rebate on future purchases of such goods. Additionally, or in the alternative, the total or partial reward may be delivered to the partner. This may be particularly attractive when the partner is a charitable organization.

The invention may be implemented by means of computer software and hardware for capturing and processing the data on financial transactions performed using the debit card, calculating the reward accrued by using the debit card, maintaining data on transactions and rewards, delivering the reward to the cardholder based upon future purchases made with the debit card and providing information to the cardholder about the rewards he or she has accumulated and has redeemed.

It will be appreciated that various features may be included in the systems and methods of the instant invention, depending upon the goals of the particular application. For example, the debit card may be provided with the logo or name of a partner on its face, along with the name or logo of the financial institution. The issuer of the debit card, that is, the financial institution, and the issuer's partner or partners, that is, the preferred retailers and sponsors, may want to offer different kinds, levels and amounts of rewards/loyalty to cardholders. These can depend on a number of factors (or combination of these factors) including: at which merchant the transaction was conducted; the amount of the given transaction or total transactions done during a specified period; the time when the transaction was performed; the manner in which the transaction was conducted (on- or off-line); the balances kept in the cardholder's financial account at the financial institution or the number and kinds of accounts owned by the cardholder at the financial institution.

In accord with another aspect of the invention, a method is provided for operating a financial service by a financial institution for a cardholder. The cardholder opens a financial account with the financial institution and is provided a debit card. The debit card is associated with the financial account such that the cardholder may use the debit card to make purchases and an amount corresponding, at least in part, to the value of the purchase made using the debit card is debited to the financial account. Periods of time are defined. An account statement is provided to the cardholder at the end of each defined period identifying, at least in part, the purchases made with the debit card during the defined period. An entity is designated as a partner. A reward amount for the cardholder is calculated based, at least in part, on purchases made using the debit card during a period. The reward amount generated during the period is credited to a cardholder reward account. That cardholder reward amount is activated at the end of the period. In a subsequent period, the amount of the value of a subsequent purchase is debited from the financial account. The financial account is credited an amount up to the amount of the subsequent purchase in the subsequent period from the activated cardholder reward account for purchases made at the preferred retailer based upon one or more of the specified criteria.

Certain implementations of this aspect of the invention provide that: the debit card is issued by the financial institution and the financial account is held by the same financial institution; the debit card is issued by a first financial institution and the financial account is held by a second financial institution; the account statement at the end of the period includes a statement of the reward amount generated in periods prior to the period and not yet redeemed, the reward amount earned during the period, the reward amount redeemed during the period, and the total reward amount earned but not yet redeemed; the account statement further includes a statement of the total reward amount generated in all periods; the logo of the financial institution is displayed on the debit card; the logo of the partner is displayed on the debit card; the partner is, in fact, a plurality of retailers; the partner is the financial institution; the reward amount is calculated, at least in part, as a percentage of the value of purchases made at the partner by the cardholder using the debit card; the reward amount is calculated, at least in part, as the sum of a first percentage of the value of purchases made at the partner by the cardholder using the debit card up to a first level of purchases and as a second percentage of the value of purchases made at the partner by the cardholder using the debit card up to a second level of purchases; the reward amount is calculated, at least in part, as the sum of a first percentage of the value of all purchases made by the cardholder using the debit card and as a second percentage of the value of purchases made at the partner by the cardholder using the debit card; the reward amount is calculated, at least in part, as the sum of a first percentage of the value of all purchases made by the cardholder using the debit card up to a first level of purchases and as a second percentage of the value of purchases made at the partner by the cardholder using the debit card up to a second level of purchases; the reward amount is calculated, at least in part, based on purchases of the designated goods made at the partner using the debit card; the reward amount is calculated, at least in part, as the sum of a first percentage of the value of certain designated goods at the partner and as a second percentage of the value of other purchases at the partner; the reward amount is calculated, at least in part, as a fixed amount for the purchase of designated goods made at the partner using the debit card in the current and/or prior periods; the reward account includes an activated component and a dormant component, and the financial account is credited for amounts up to the amount of purchases made by the cardholder at the partner using the debit card from the activated component of the reward account up to the full amount of the active component; and the dormant component corresponds to amount earned in a current period and the dormant component is automatically activated at the end of the current period.

In accord with another aspect of the invention, a system of reward management and tracking for a debit card reward program for a partner in a current period is provided. A cardholder has a financial account with a financial institution and a debit card is issued to the cardholder. The debit card is associated with the financial account such that the financial account is debited for purchases made by the cardholder with the debit card. The system includes a computer memory means for storing data and a computer processor operably engaged to the computer memory means. The computer processor includes means for storing the identity of the cardholder, means for storing the reward earned by the cardholder prior to the current period, means for calculating the reward earned by the cardholder during the current period, means for activating the reward earned during the current period at the end of the current period, means for crediting the financial account an amount corresponding to a purchase made during the current period from the partner, up to an amount equal to the reward earned by the cardholder prior to the current period, and means for reducing the amount of the reward earned by the cardholder prior to the current period by an amount corresponding to the amount that the financial account was credited.

Certain implementations of this aspect of the invention provide that: the debit card is issued by the financial institution and the financial account is administered by the same financial institution; the debit card is issued by a first financial institution and the financial account is administered by a second financial institution; a means is provided for generating a account statement at the end of the current period including a statement of the reward amount generated in periods prior to the current period and not yet redeemed, the reward amount earned during the current period, the reward amount redeemed during the current period, and the total reward amount earned but not yet redeemed; the account statement further includes a statement of the total reward amount generated in all periods; the logo of the financial institution is displayed on the debit card; the logo of the partner is displayed on the debit card; the partner comprises a plurality of retailers; the partner is the financial institution; means are provided for calculating the reward earned by the cardholder, at least in part, as a percentage of the value of purchases made at the partner by the cardholder using the debit card; means are provided for calculating the reward earned by the cardholder, at least in part, as the sum of a first percentage of the value of purchases made at the partner by the cardholder using the debit card up to a first level of purchases and as a second percentage of the value of purchases made at the partner by the cardholder using the debit card up to a second level of purchases; means are provided for calculating the reward earned by the cardholder, at least in part, as the sum of a first percentage of the value of all purchases made by the cardholder using the debit card and as a second percentage of the value of purchases made at the partner by the cardholder using the debit card; means are provided for calculating the reward earned by the cardholder, at least in part, as the sum of a first percentage of the value of all purchases made by the cardholder using the debit card up to a first level of purchases and as a second percentage of the value of purchases made at the partner by the cardholder using the debit card up to a second level of purchases; means are provided for calculating the reward earned by the cardholder, at least in part, based on purchases of the designated goods made at the partner using the debit card; means are provided for calculating the reward earned by the cardholder, at least in part, as the sum of a first percentage of the value of certain designated goods at the partner and as a second percentage of the value of other purchases at the partner; means are provided for calculating the reward earned by the cardholder, at least in part, as a fixed amount for the purchase of designated goods made at the partner using the debit card; the reward earned by the cardholder includes an activated component and a dormant component, and the financial account is credited for amounts up to the amount of purchases made by the cardholder from the partner using the debit card from the activated component of the reward earned by the cardholder up to the full amount of the active component; the dormant component corresponds to amount earned in a current period and the dormant component is automatically activated at the end of the current period.

In accord with yet another aspect of the invention, a method of operating a debit card reward program for a cardholder by a financial institution in cooperation with a sponsor is provided. A debit card is provided to the cardholder. The debit card is associated with a financial account such that the cardholder may use the debit card to make purchases, and an amount corresponding, at least in part, to the value of the purchase made using the debit card is debited to the financial account. Periods of time are defined. An account statement is provided to the cardholder at the end of each defined period identifying, at least in part, the amount of the purchases made with the debit card during the defined period. A reward amount for the cardholder is calculated based, at least in part, on purchases made using the debit card during a period. The reward amount generated during the period is credited to a cardholder reward account. The cardholder reward amount is activated at the end of the period. The cardholder, the financial institution or the sponsor elects whether to provide the cardholder reward amount to the sponsor or to the financial account. When provision of the reward amount to the sponsor has been elected, the reward amount is delivered to the sponsor. The amount of the value of a purchase in a subsequent period is debited from the financial account and the financial account is credited an amount up to the amount of the purchase in the subsequent period from the activated cardholder reward account for purchases made when provision of the reward amount to the user's financial account has been elected.

Certain implementations of this aspect of the invention provide that: the sponsor is a charitable, non-profit or not-for-profit institution; the sponsor has a theme and an increased reward is accrued for purchases from retailers who market goods or services consistent with the sponsor's theme; the financial account can only by accessed via non-branch channels; the amount credited to the reward amount is received, at least in part, from the financial institution; the amount credited to the reward amount is received, at least in part, from the retailers; the amount credited to the reward amount is received, at least in part, from the sponsor; the debit card bears the logo of the sponsor; an electronic link is provided between web sites of the sponsor and the financial institution; an electronic link is provided between web sites of the retailers and the financial institution; an electronic link is provided between web sites of the retailers and the sponsor; an electronic link is provided between web sites of the financial institution, the retailers and the sponsor; a discount price is provided for selected purchases made at the retailers by the cardholder using the debit card; a program is developed by the sponsor including discounts on selected goods by the cardholder using the debit card related to a theme consistent with the sponsor, and the theme is presented to the cardholder as part of a fund raising or membership campaign of the sponsor.

In accord with another aspect of the invention, a method is provided for operating a debit card reward program by a financial institution for a user in conjunction with a retailer. A debit card is provided to the user. The debit card is associated with a financial account such that the user may use the debit card to make purchases at a point of sale to purchase goods and an amount corresponding, at least in part, to the cost of the purchase made using the debit card is debited to the financial account. A reward-generating activity is defined in terms of selected characteristics of each purchase made by the user from the retailer using the debit card. Transaction data regarding each purchase made by the user using the debit card is captured including, at least in part, information concerning the selected characteristics. The transaction data includes transaction financial information and transaction purchase information. The transaction financial information relates, at least in part, to financial characteristics of each purchase made by the user from the retailer using the debit card. The transaction purchase information relates, at least in part, to particular goods sold at each purchase made by the user from the retailer using the debit card. The financial institution stores transaction financial information related to each purchase made by the user from the retailer using the debit card. The retailer stores transaction purchase information related to purchase made by the user from the retailer using the debit card. The transaction financial information and the transaction purchase information is compared to the selected characteristics. A reward is calculated based, at least in part, on the comparison. The reward then delivered.

In accord with another aspect of the invention, method is provided for operating a financial service by a financial institution for a user. A debit card is provided to the user. The debit card is associated with a financial account such that the user may use the debit card to make purchases and an amount corresponding, at least in part, to the cost of the purchase made using the debit card is debited to the financial account. Periods of time are defined. At least one retailer is defined as a preferred retailer. A reward amount for the user is calculated based, at least in part, on purchases made using the debit card during a current period. The reward amount generated during the current period is credited to a user reward account. The user reward amount is activated at the end of the current period. The amount of the cost of a purchase in a subsequent period is debited from the financial account and subsequently crediting the financial account an amount up to the amount of the purchase in the subsequent period from the activated user reward account for purchases made at the preferred retailer. A report is provided to the user at the end of each defined period identifying, at least in part, the reward amount.

BRIEF DESCRIPTION OF THE DRAWINGS

FIG. 6 is a billing report.

DETAILED DESCRIPTION OF THE INVENTION

Figure 1:
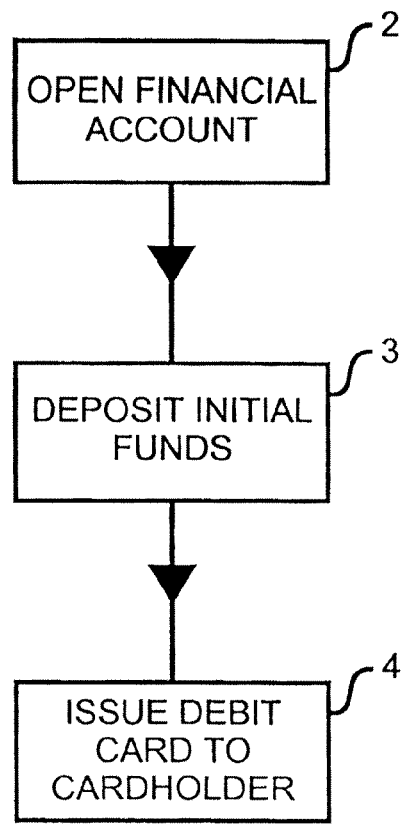
FIG. 1 is a flow chart depicting the opening of a new account.

The system of the instant invention is designed to enable financial institutions and retailers (also referred to as "merchants") to offer loyalty/rewards programs whether the debit card transaction is processed on-line or off-line. This program and system are also designed to enable the financial institution to track the transactions performed by the cardholder at different merchants and, based on pre-existing arrangements, offer cardholder different rewards for transactions done at different merchants.

Referring generally to the drawings, in accord with an embodiment of the invention, a debit card 300 (FIG. 2) will be issued to a cardholder when he or she opens a financial account at the financial institution. This debit card enables the cardholder to make purchases via either off-line debit card networks or on-line networks, as one skilled in the art would appreciate. An example of off-line debit card networks includes MasterDebit, the off-line debit card network of MasterCard. Of course, the VISA debit card network, or other such off-line debit card network can be employed and practice the invention. Examples of on-line debit card networks are Cirrus, Maestro, the MasterCard network, NYCE. Of course, other such on-line debit card networks can be employed and practice the invention. The debit cards may have multiple brands and multiple functionality, enabling them to be used by their holders to withdraw cash, check balances and perform other functions at ATMs as well as conduct purchases of goods and services either using the on-line networks or the off-line networks.

In a typical application, the invention is employed to operate the debit card 300 as part of a loyalty or reward program. The financial institution collaborates with an entity, such as a commercial entity (e.g., retailers, including gasoline companies, computer stores or clothing stores, service providers, including insurance companies, Internet service providers or airlines, manufacturers or other merchants) or a charitable or non-profit institution, that can benefit from the directed use of a debit card. As used herein, the term "retailer" shall be understood broadly, meaning any entity that provides goods or services that can be purchased with a debit card. Similarly, "goods" shall be understood to include any products or services. The entity collaborating with the financial institution is referred to as a "partner" or "sponsor." In this context, the "partner" may include several retailers or other entities, all partners of the financial institution. Further, the partner can be the financial institution itself, should it seek to encourage the cardholder to purchase financial services using the debit card. The partner may also be an institution having a theme-such as an insurance company wishing to encourage healthy lifestyles among its policy holders. The debit cardholder uses the debit card to make purchases, both at the partner and otherwise. As a reward for using the debit card, the cardholder generates a reward amount. This reward amount is funded by the financial institution, the partner, or a combination of both. This reward amount is printed on a monthly statement sent to the cardholder or on an interim statement accessible via devices such as the phone, ATM or Internet.

At the end of the period in which the reward was earned, it becomes "activated," that is, it is available for redemption by the cardholder. To obtain the reward, the cardholder makes a purchase from the partner. The purchase is debited from the financial account in the traditional fashion. Information regarding the purchase may be collected from the financial institution or from its processing agent who transfers it to the financial institution. The financial institution then credits the cardholder's financial account for an amount up to the amount of the purchase from the partner from the activated portion of the user's reward account. Of course, the amount credited is limited by the amount that the cardholder has activated in the reward account at the time of purchase.

In certain applications of the invention, a sponsor, such as a charitable institution, collaborates with the financial institution. Commercial partners may also be part of the program. The sponsor defines a theme and identifies debit card activity that is consistent with the theme. For example, if the sponsor was an organization dedicated to citizen health issues, debit card purchases of healthy foods, exercise equipment and gym membership might be identified as "consistent." The cardholder earns rewards for using the debit card to make purchases of the theme-consistent goods and services. The reward earned by the cardholder can be delivered to the sponsor. Alternatively, a portion of the earned reward can be delivered to the sponsor while the remainder of the earned reward can be credited to the reward account, as discussed above. The program can be expanded to include a discount on products or services that are theme-consistent. Further, the retailers marketing such products or services may become partners, allowing the cardholder to earn additional rewards and obtain their reward by shopping at one of these partners. In the case where the sponsor is an insurance company, covered services, such as doctor visits can be paid for in full using the debit card with the insurance company reimbursement being made as a credit to the financial account or as a reward.

Referring now specifically to FIG. 1, which is a flow chart depicting the opening of a new account by a bank customer or "cardholder" or "user." At block 2, the cardholder opens a financial account with a financial institution. At block 3, the cardholder deposits initial funds into the financial account. The debit card 300 (see FIG. 2) is then issued to the cardholder at block 4.

Preferably, the financial account is a demand deposit account. It will be appreciated that the financial account may include demand deposit accounts, checking accounts, savings accounts, share draft accounts, money market accounts, cash or investment management accounts, and the like, which are referred to herein collectively as "financial accounts." Currently, it is envisioned that the financial institution is a bank. However, it will be appreciated that other financial institutions or entities that provide processing to financial institutions may employ the systems and methods of the instant invention. In particular, the invention may be employed by savings and loan institutions, credit unions, brokerage firms, mutual fund companies, insurance companies and the like. Further, it will be appreciated that while it is preferred that a single financial institution issue the debit card and administer the reward program, these functions could be performed by two or more distinct entities and still practice the invention. For example, the financial institution can issue the debit card while an incentive company can administer the reward aspect of the invention. Further, the reward aspect of the program can be run by a partner of the financial institution, such as a preferred retailer or a program sponsor (discussed below).

Figure 2:
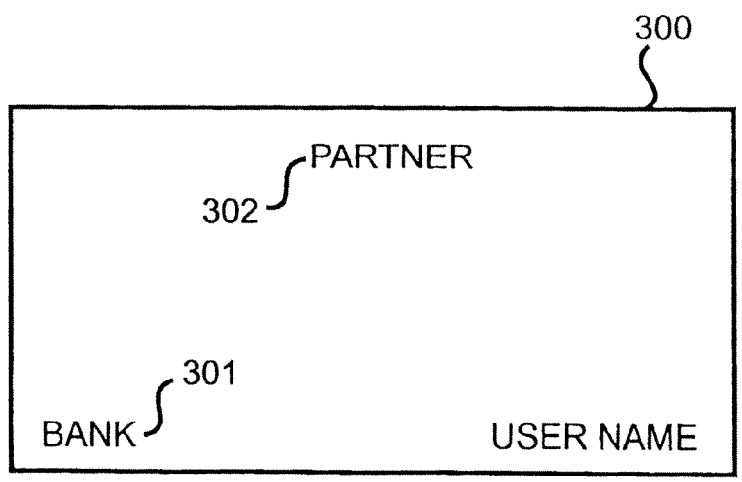
FIG. 2 is a debit card for use in accord with the instant invention.

Referring to FIG. 2, a typical debit card 300 is shown. The identity of the financial institution is preferably depicted on the face of the debit card by means of a logo 301. Since financial institutions desire to maximize the utility of debit cards, giving their cardholders the greatest amount of choice in how to conduct transactions, most financial institutions enable their cards to be used to conduct ATM withdrawals as well as to perform both on- and off-line transactions. In order to communicate to cardholders where the cards are accepted, the cards will contain the logos of those ATM, debit or credit networks where the cards can be used. In addition to the name of the issuing financial institution and networks where the cards can be used, such debit cards may also be co-branded with the names or logos 302 of participating merchants, i.e., partners. Of course, the logos of the financial institution, the sponsor and the preferred retailer can all be displayed on the card.

These co-branded merchant or merchants have several objectives in issuing such debit cards. These include: serving as a marketing vehicle to communicate the merchant's brand to the cardholder; utilizing the debit card as a payment vehicle, thereby being able to capture and track information on the cardholder's purchases at that merchant and at other merchants and using such information to provide incentives to the cardholder to make additional purchases at the merchant; and reducing the risk and cost associated with cash or credit transactions.

Figure 3:
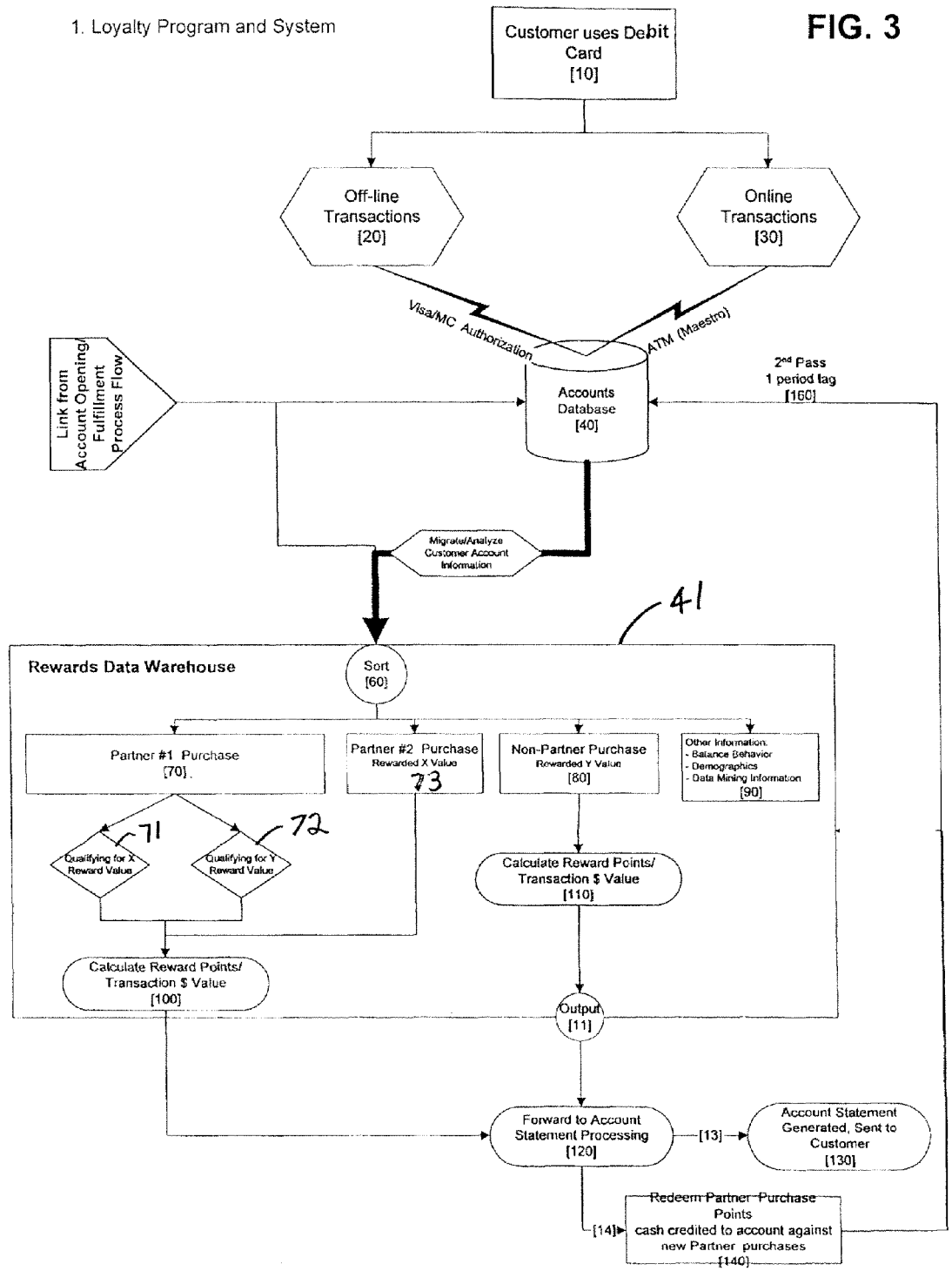
FIG. 3 is a flow chart depicting process flows associated with an aspect of the invention.

Referring to FIG. 3, which is a flow chart depicting the process flows associated with an embodiment of the invention, the customer uses the debit card at block 10. This use may be to make a purchase of goods at a retailer, to purchase services, to withdraw cash, or other transaction for which a debit card may be employed. As currently envisioned (and in accord with the current practice), the cardholder is issued a physical, plastic card having a magnetic stripe that includes certain identifying information. It will be appreciated that it is the identifying information that is useful in operating the system and method of the instant invention. Other means, beside the physical plastic card, may be employed to deliver this information and still practice the invention. For example, a data file on a user's computer may include the identifying information and therefore be a "debit card." This may be particularly useful for on-line purchases made over the Internet. Any means, technique or device that carries this identifying information is a "debit card" for the purpose of this invention.

Depending on the networks and capabilities authorized for the cardholder and indicated on the card, the cardholder may elect to use the card in one of two modes: on-line (block 30) or off-line (block 20). In those situations where the cardholder initiates the transaction him or herself by swiping the card through a terminal designed to read the information contained on the card, the cardholder may be presented by the terminal with a message and/or a button asking how the transaction should be processed. The cardholder is given two choices, each of which may be described in a number of different ways depending on the terminal operator. The choices can be called either "Credit" or "Debit," generally corresponding to off-line or on-line transaction processing. Depending on the terminal operator, transaction network and financial institution, the rules, costs to the cardholder, merchant or financial institution or methods of processing may differ for the different kinds of transactions. However, the basic purpose of the transaction is the same, resulting in a debit to the cardholder's account for the amount of the goods purchases plus any service charges.

Figure 7A:
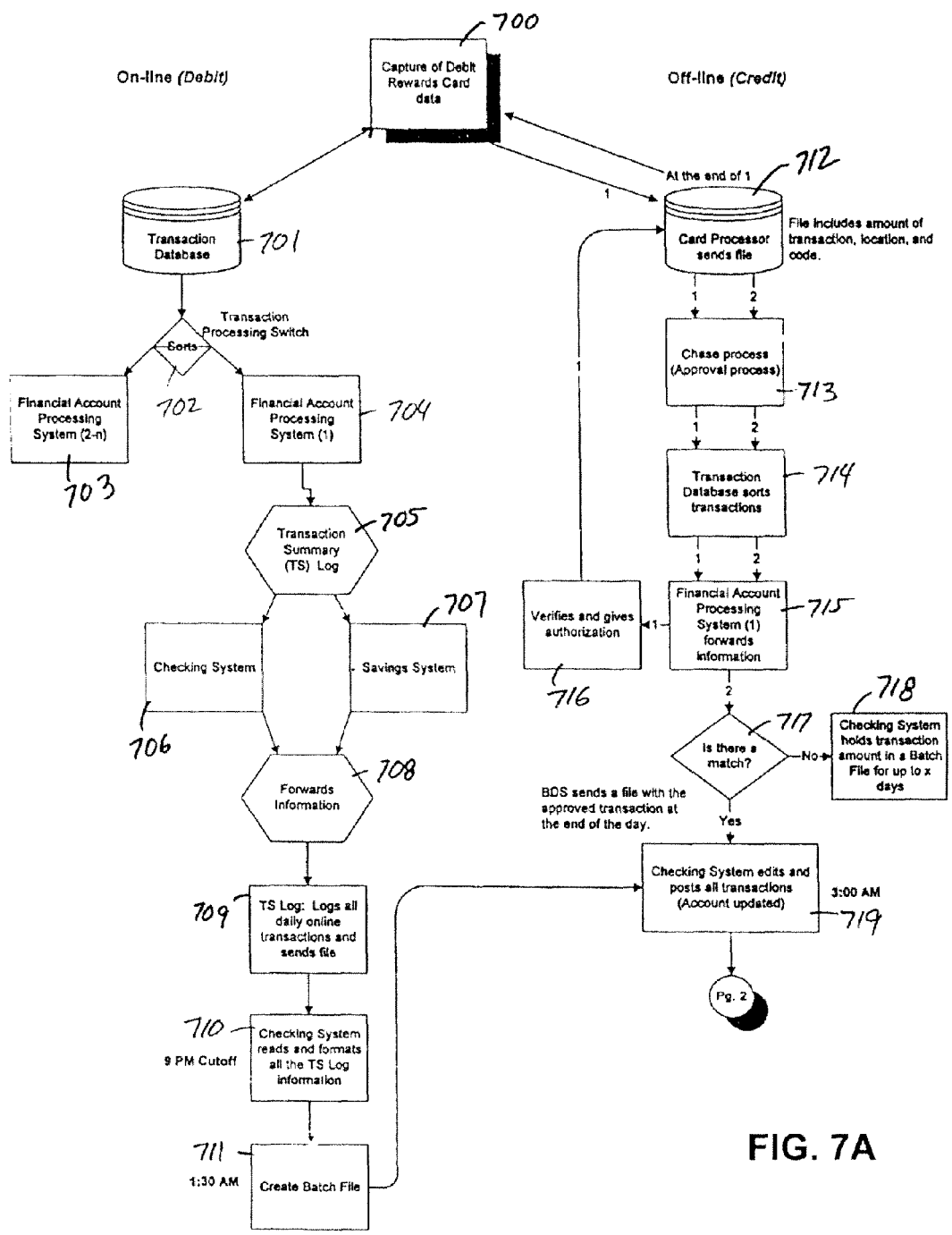
FIGS. 7A and 7B are flow charts comparing on-line versus off-line processing.
Figure 7B:
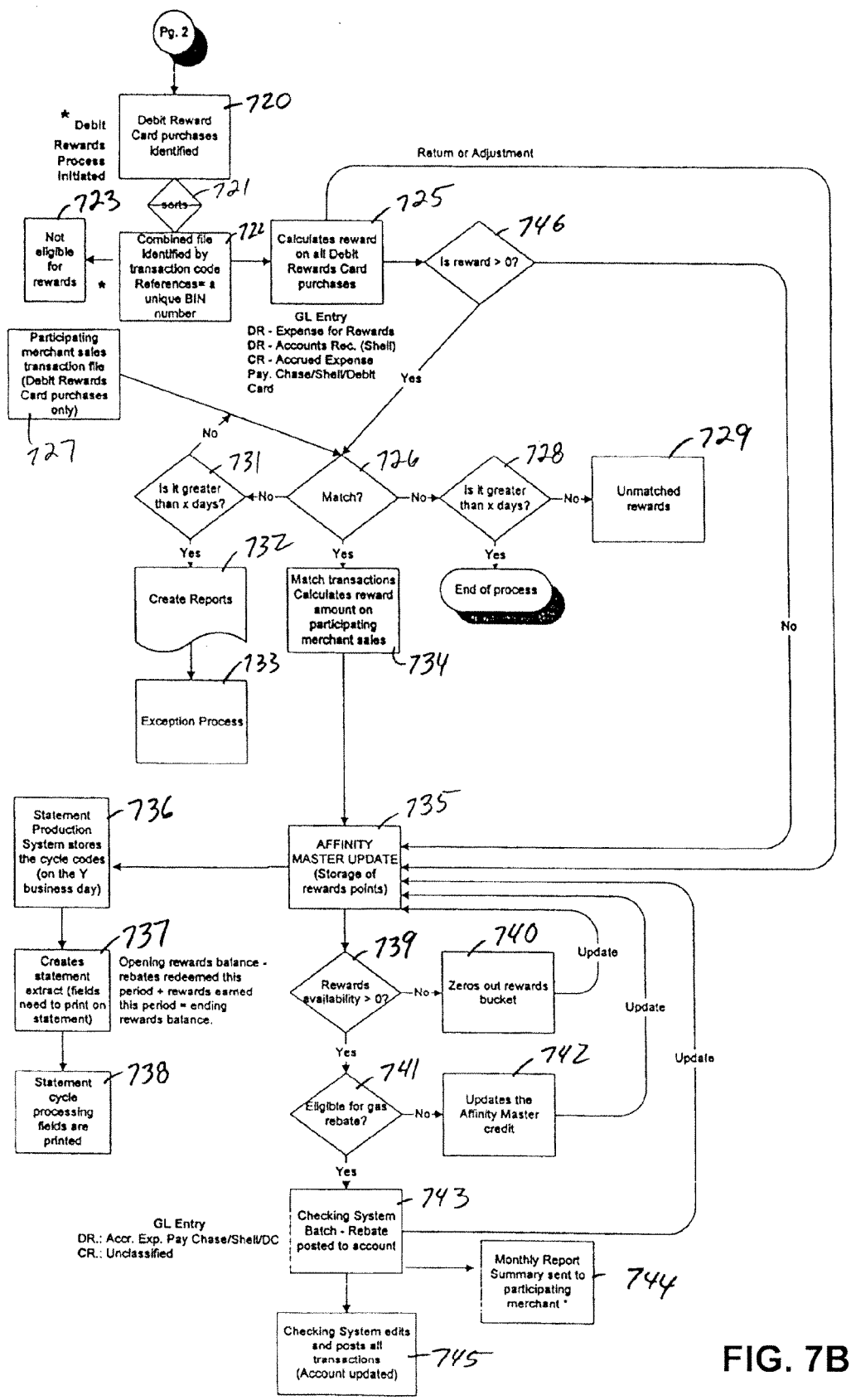

The processes and cardholder interface for the off- and on-line networks are significantly different (discussed in more detail with respect to FIGS. 7A and 7B). On-line debit transactions at the point of sales leverage the existing ATM processing infrastructure (cards, network switches, gateways, processing software, etc.) to directly debit the cardholder's bank account as if a withdrawal had been made at an ATM. Transaction requests are routed to the issuer bank via a regional or national/international switch interchange. When a cardholder swipes the ATM/debit card at the point of sale, they are required to enter a personal identification number (PIN) which is authenticated by the financial institution (typically, an issuer bank), following the financial account or a linked credit account being verified as being in good standing and with sufficient funds. After the account and ATM/debit card are validated and authenticated, on-line authorization of the transaction begins. On-line authorization is performed in real time by the financial institution's own systems against current account balances and daily limits. Completed transactions are used to update directly the cardholder and financial account database.

The off-line debit card works like a credit card at the point of sale with approval and clearing taking place through the credit card association networks and requiring the cardholder's signature to complete the transaction. Instead of receiving a separate itemized bill, however, the amount of purchase is deducted from the cardholder's checking account and the details of the transaction are recorded on his monthly statement, as though a check has been written to the retailer. An off-line debit card is accepted at merchants wherever the equivalent credit card is; in fact, the retailer often cannot differentiate between them. The off-line transaction process mimics the credit card transaction process; that is, it involves two transaction messages—one for authorization and one for settlement. The settlement information takes two to three days to reach the issuer. The authorization for this type of transaction is generally obtained on-line, but the transaction itself is transmitted and processed via either the credit card system or the ACH, incurring a delay in posting of the completed transaction.

Referring again to FIG. 3, information concerning the transaction captured at the point of sale is transferred to an accounts database 40. The transaction information may include the identity of the cardholder, the retailer at which the purchase was made, the value of the goods purchased, the date and time of the purchase, the goods purchased, the manufacturer of the goods purchased, SIC codes, the location of the retailer, and so on. The information concerning the transactions for each cardholder is collected for further analysis. The information can be employed to generate demographic information regarding the customers of certain goods or retailers and the purchasing patterns of the cardholder, such as at block 90. The account database, as well as the systems for performing the steps of the invention after the capture of the transaction data, are typically maintained on a computer or combination of computers, under the control of the financial institution. Of course, these steps may be performed using various combinations of hardware and software, as would be appreciated by one skilled in the art.

To calculate the reward, the collected transaction information is compared to a set of rules stored in memory of a computer controlled by the financial institution. This rule can be modified by the financial institution to permit a flexible application of the reward. For example, a gasoline retailer may wish to give an increased reward for gasoline purchases made on Tuesday during a three-month period. The rules may be modified to search the accounts database for gasoline purchases made at that gasoline retailer on Tuesdays and grant the reward. Once the three-month period is over, the rules can be modified to eliminate that additional reward.

Referring again to FIG. 3, the reward is calculated at the reward data warehouse 41. The information is sorted into predetermined parameters. The parameters are ordered based upon the particular rule applicable for that given program. In one embodiment, the transaction information is sorted at block 60 by the identity of the retailer and the type of goods purchased. If the retailer is a first partner in the program, the processing moves to block 70. In this embodiment, the first partner has elected to provide an increased reward for specific preferred goods. The preferred goods are identified at block 71. The reward corresponding to the purchase of those preferred goods is calculated at block 100. The goods purchased at the first retail that are not classified as "preferred goods" are identified at block 72. The reward applicable to these purchases (if any) is also calculated at block 100 and the rewards for purchases made at the first partner are totaled at block 100.

The purchases made at a second partner are identified at block 73. In this instance, the second partner has elected to provide a straight percentage reward for all purchases at the second partner. This reward is calculated at block 100 and totaled with the other earned rewards at block 100.

Any purchases made at non-partner retailers are identified at block 80. The reward accrued for these purchases, if any, are calculated at block 110. If such a reward is accrued, they presented as output at block 11 and delivered to block 120 for processing.

The information regarding the reward, regardless of its source, is collected for processing at block 120. Periodically, an account statement is generated at block 130 and forwarded to the cardholder. Preferably, the statements are transmitted monthly. At block 140, the system determines whether the cardholder has any reward points available. Typically, the available reward will be attributable to uses of the debit card in prior periods. However, reward points may be delivered to the reward account at the opening of the financial account, or otherwise, to encourage card usage. If so, an amount corresponding to the purchases made at one of the partners is credits to the financial account. The amount credited is then deducted from the available reward stored in the accounts database 140.

Figure 4:
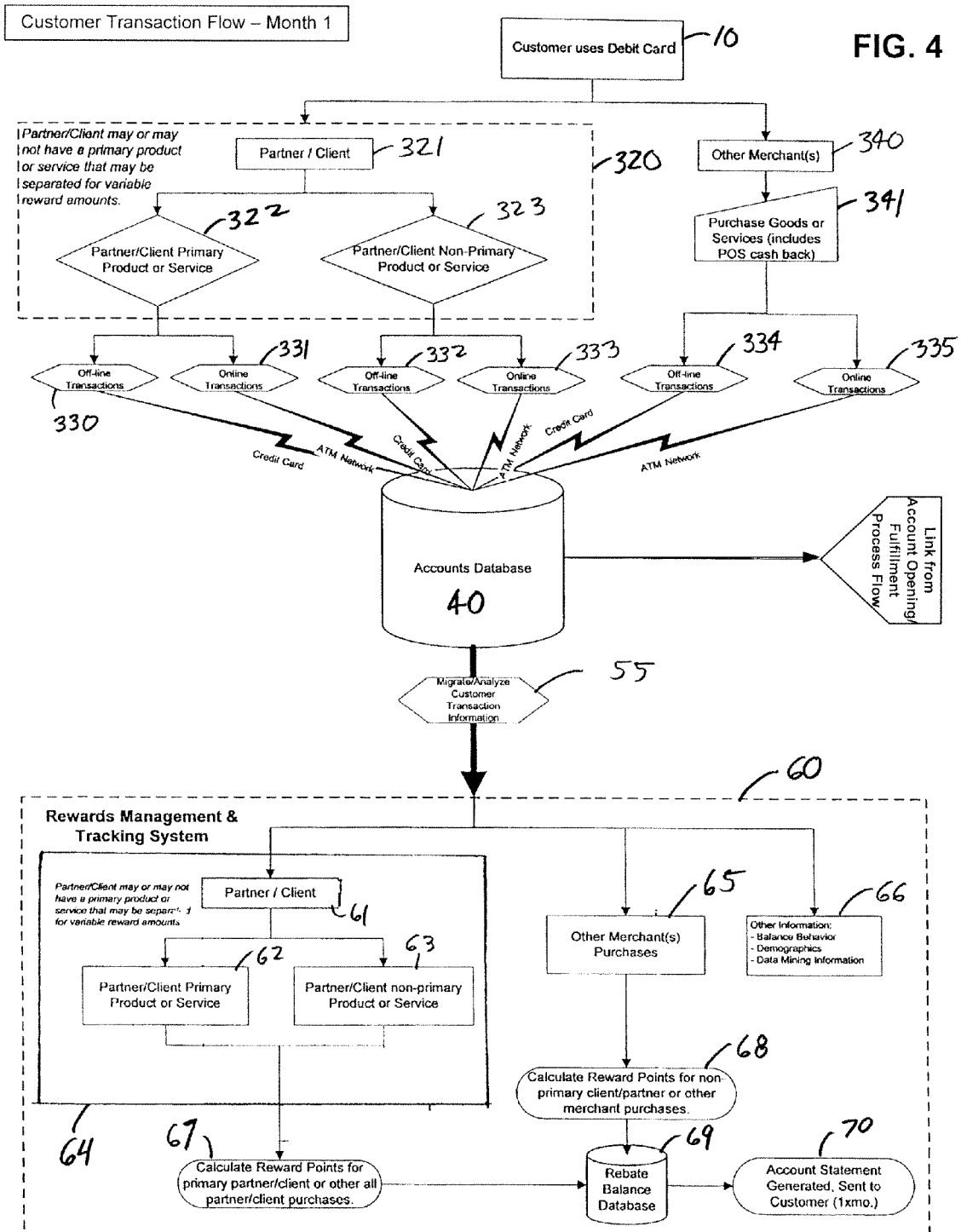
FIG. 4 is a flow chart depicting cardholder transaction flow for the first period.

FIG. 4 is a flow chart depicting cardholder transaction flow for the first month that a cardholder owns the debit card 300. The cardholder uses the debit card at block 10. The debit card is used in conjunction with a conventional transaction-processing network capable of processing either on- or off-line debit transactions or both types of transactions. Such transaction processing networks are commonly used at a broad variety of merchants including: retail stores, gasoline stations, restaurants and eating establishments, health care facilities, entertainment and sporting events, professional offices, on-line retailers, transportation and travel providers. As is known in the art, each of these processing methods has different flow paths of the payment information, different input and output fields and is processed differently at the issuing financial institution. Depending on the flow of the transaction, there are different values associated with the transactions as well as different levels of security for the cardholder and the merchant and payment surety for the merchant.

If the purchase is made at a partner, the system proceeds to the processing in block 20. The status as a preferred retailer is determined at block 321. The preferred retailer records the nature of the goods or services purchased by the cardholder. If the purchase is of the preferred retailer's primary product or service, the processing proceeds to block 22. If the transaction is being handled as an "off-line" transaction, processing proceeds to block 330. If the transaction is to be handled as an "on-line" transaction, the processing proceeds to block 331. Information concerning the purchase, including the identity of the partner, the goods or services purchased and the time and date of purchase, is recorded on the accounts database 40.

If the purchase made by the cardholder with the debit card is at the preferred retailer, but is not a primary product or service, the processing proceeds to block 323. If the transaction is being handled as an "off-line" transaction, processing proceeds to block 332. If the transaction is to be handled as an "on-line" transaction, the processing proceeds to block 333.

Information concerning the purchase, including the identity of the preferred retailer, the goods or services purchased and the time and date of purchase, is recorded on the accounts database 40.

If the purchase made by the cardholder with the debit card, but at a retailer that is not a preferred retailer, the processing proceeds to block 340. The purchase of goods or services is performed, and any point of sale cash back provisions are handled at block 341. If the transaction is being handled as an "off-line" transaction, processing proceeds to block 334. If the transaction is to be handled as an "on-line" transaction, the processing proceeds to block 335. Information concerning the purchase, including the identity of the retailer, the goods or services purchased and the time and date of purchase, is recorded on the accounts database 40.

The participating merchant's acquirer (the entity that captures the transaction information at the point of sale) interrogates all debit card transactions conducted at the point of sale and identifies all loyalty/rewards debit card transactions using the cards' unique BIN number. This identification typically occurs on a daily basis and is captured on a separate file that the acquiror sends electronically directly to the issuer bank. These transactions are flagged as partner transactions.

All transactions done by debit card cardholders at participating merchants, previously flagged are used as input to a system that calculates reward points based on criteria found in the transaction data. This data could include all purchases at the merchant (for example, all gasoline purchased at a specific company), purchases of a specific product or service (for example, only premium gasoline purchased at a specific company) or only purchases above a set amount (for example, all purchases over $10), all purchases done during a specific time period, or a combination of the above factors. Of course, other factors may be employed and still practice the invention, depending upon the particular goals of the financial institution, the retailers or partner and the cardholder. The output of this system consists of future value that the cardholder can redeem when making future purchases using the debit card only at the participating merchant(s). The value that can be redeemed at the participating merchant is posted on the accounting system and where it is maintained on the account statement processing system.

All transactions done by debit card cardholders at all other merchants (those that are not participants in the program) are used as input to a system that calculates reward points based on criteria found in the transaction data. The parameters used to calculate the value to be granted to the cardholder from this system can be different from those parameters used to calculate rewards to be granted to the cardholder from participating merchants. The output of this system is also forwarded to the accounting system for posting on the account statement processing system.

From the reward processing system, the accrued value accumulated by the cardholder is forwarded to two sub-systems: one subsystem generates the statement (see block 130 of FIG. 3) and the other subsystem redeems the reward against the purchases (see block 140 of FIG. 3). To provide the cardholder with information about his accumulated and redeemed awards, a statement is produced and is provided to the cardholder. The statement can be sent via mail, displayed on an ATM or other terminal device, electronically mailed to the cardholder or available via the cardholder's PC to be retrieved.

The value to be redeemed for future purchases at participating merchants is captured in a file. This file includes the following fields: previous rewards earned, reward amounts redeemed, current rewards earned, total reward available for redemption at participating merchants; the total reward amount earned since a prior date and an expiration date for the current value in the program accrued to date.

Referring again to FIG. 4, the cardholder transaction information related to the usage of the debit card is analyzed at blocks 55 and 60. Preferably, this step is performed by a general purpose computer at the financial institution operating under the direction and control of appropriate software. Of course, a specific purpose computer, or a combination of hardware, software, firmware, microcomputers, minicomputers, personal computers, etc., either directly combined or connected via a network, telephone line, cable line, direct electrical connection, satellite transmission, the Internet, or other such system, may be employed to practice the invention.

The processing of the cardholder transaction information is depicted at block 60. The information concerning purchases at a preferred retailer is analyzed at block 64. The purchases at the preferred retailer are identified at block 61. If the program calls for a different reward rate for a primary product or service of the preferred retailer (typically higher than the reward for other products from the preferred retailer or products from other retailers), the purchases of the primary products are identified at block 62. This information is transferred to block 67 at which point the reward is calculated.

The purchases at the preferred retailer which are not of the primary product are identified at block 63. If the program calls for a different reward rate for a primary product or service of the preferred retailer, the purchases of the non-primary products are identified at block 63. This information is transferred to block 67 at which point the reward is calculated. Of course, in programs where there is no reward distinction among products purchased at the preferred retailer, in order to simplify the processing, all the purchases identified at block 61 may be transferred to block 67 directly for reward calculation.

Purchases made at non-preferred retailers are identified at block 65. This information is transferred to block 68 where the appropriate reward is calculated. The reward information from blocks 67 and 68 are transferred to the rebate balance database 69. An account statement is generated at block 70 and transmitted to the cardholder. At this time, the reward for the current period, which had been dormant (i.e., unable to be redeemed) is activated, such that it can be redeemed against future purchases in accord with the rules of the particular card program.

The cardholder transaction information can also be analyzed for various data mining and database marketing purposes useful to the financial institution, the preferred retailer or a sponsor. In particular, balance behavior, product and/or purchase amount behavior, demo-graphic information concerning purchasing patterns and the like can be determined at block 66.

The rewards calculated at blocks 67 and 68 are transferred to block 69, at which point the reward amounts are stored in a rebate database. The program aggregates all of the transactions conducted by all of the cardholders using their debit cards at all merchants into a database. This database can either be a separate file or can be combined with the file maintained by the financial institution in the normal course of business and that is used as the master source for all accounting functions. The information from the rebate database is used to create an account statement at the end of the period that is sent to the cardholder.

The program and system is preferably able to calculate the rewards or incentives based on a number of different factors, which may be subject to change from time to time. These variable factors may include:

The partner's participation in the program either on a permanent or temporary basis.

How the transactions originated from the merchant, whether on- or off-line.

The value of the reward or rebate offered to the cardholder, which may vary by participating merchant(s).

How the reward or rebate is delivered to the cardholder.

How the reward or rebate can be redeemed by the cardholder. The expiration date or dates for the rewards or rebates.

The number and type of accounts and balances held by the cardholder at the financial institution, which can be calculated.

Different classes of cardholders may be offered different account types and different rates and fees.

Cardholders will be notified on a periodic basis about various aspects of their accounts through various channels and systems. These include: period (for example, monthly or quarterly) printed statements; automated telephone-based systems such as Voice Response Units accessible via touch-tone telephones or human operators; Automated Teller Machines and other such public terminal devices and Personal Computer based interactive systems using such channels as the Internet Through these systems, cardholders can get information about their banking accounts as well as transactions done using the debit card. Basic information about their banking account, including: deposits, ATM withdrawals, checks written, interest accrued, services charges and balance levels will be displayed. For merchants accepting the debit card, cardholders will also be able to get detailed information about the purchase transactions. Such information can include: date, amount, location and nature of goods or services purchased. In addition, program participants (i.e., cardholders) will receive information on the amounts of rewards eligible for redemption from prior periods, rewards/rebates earned in the current period, redemption made by the cardholder in the current period and remaining balance levels for rewards eligible for redemption in future periods.

It will be noted that the program can be administered either in real time or on periodic intervals, based on the needs of the partner and financial institutions. In real-time mode, all of the transactions generated by cardholders are continually run and any new transactions conducted by cardholders have their value credited to the cardholder's account immediately. Alternately, the programs can be run on a less frequent but periodic basis (e.g., daily, monthly, or quarterly) with the rewards being credited to the cardholder at such period intervals. Currently, it is preferred that the rewards be activated on a monthly basis. Of course, once activated, the rewards can be redeemed whenever the debit card is used as required by that given program.

Figure 5:
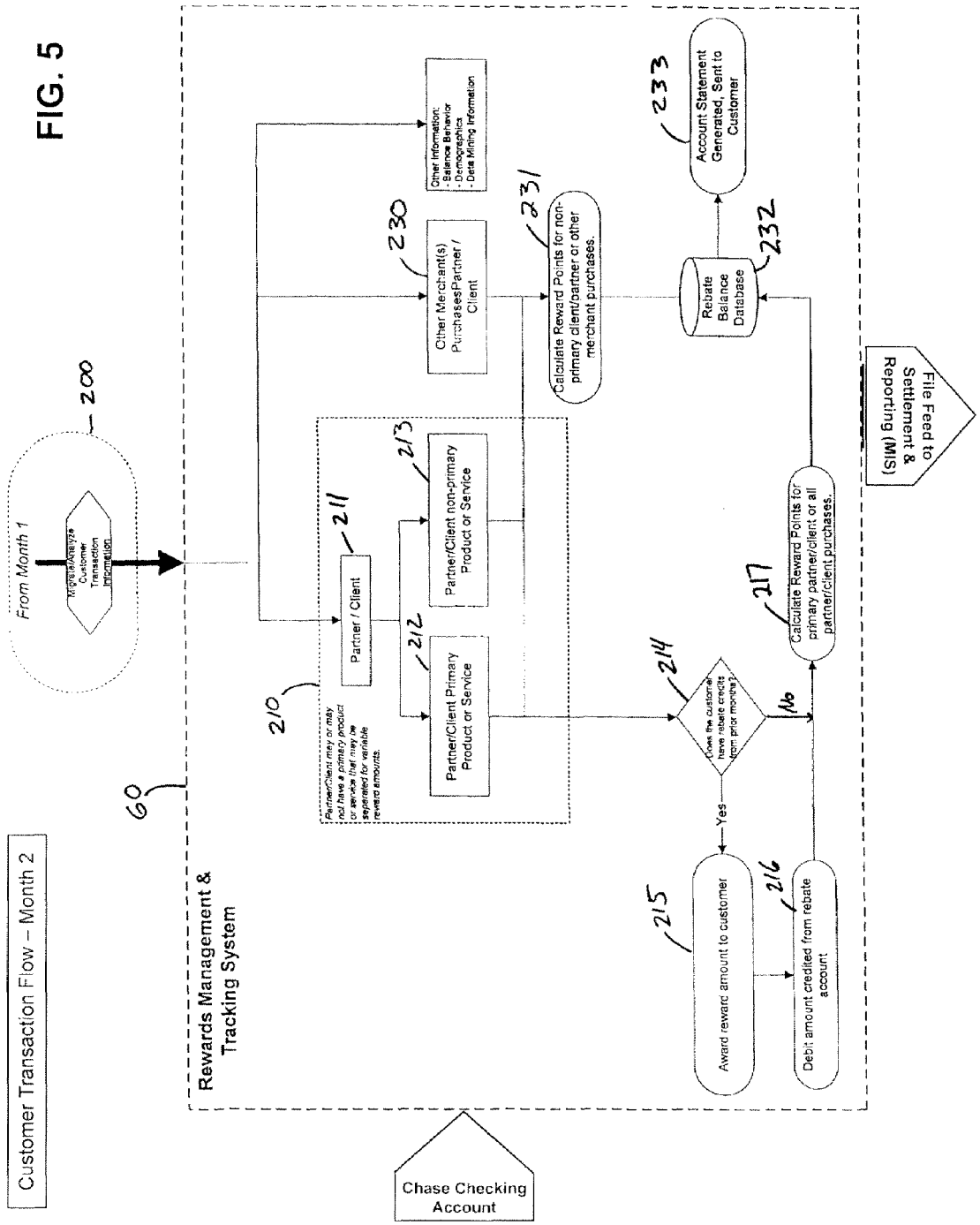
FIG. 5 is a flow chart depicting cardholder transaction flow after the first period.

As shown in FIG. 5, which is a flow chart depicting the cardholder transaction flow for a period after the first period, the cardholder transaction information is collected as discussed above with regard to FIG. 4 for analysis at block 200. The cardholder transaction information is transferred to block 210 and the purchases made at the preferred retailer are identified at block 211. The purchases of the primary product of the preferred retailer are identified at block 212 while the purchases at the preferred retailer that are of non-primary products are identified at block 213.

With these purchases identified, the system determines at block 214 whether the cardholder has any activated reward amount for prior periods. If so, an award is transferred to the cardholder at block 215 and the cardholder's financial account is credited accordingly. The award is typically the lesser of the total amount of activated reward in the cardholder reward account or the total purchase price of a qualifying purchase. Of course, it may be desirable to provide a user with additional reward amounts to encourage card usage (e.g., double reward points for certain, selected redemption activity). After the award has been credited to the financial account, the corresponding amount is debit from the cardholder reward account at block 216. The system then calculates the reward points for the purchases at the partner at block 217. The newly calculated reward points are stored in the rebate database 232.

If, at block 214, the cardholder did not have any activated reward amount from the prior month in the reward account, the system then calculates the reward points for the purchases at the partner at block 217. The newly calculated reward points are stored in the rebate database 232. Since no reward amount was available in the cardholder's reward account, there was no award credited to the financial account.

It will again be appreciated that if the program does not provide differing rewards among the purchases at the preferred retailer, in order to simplify the processing, all the purchases identified at block 211 may be transferred to block 214 directly for processing. Further, if the program is set up so that rewards are only applied to purchases of the primary product of the preferred retailer, the information identified in block 213 may be directly transferred to block 231 for the calculation of the reward amount.

Purchases made at non-preferred retailers are identified at block 230. This information is transferred to block 231 where the appropriate reward is calculated. The newly calculated reward points are stored in the rebate database 232. The reward points for the purchases made at the preferred retailer and those made at non-preferred retailers are summed at block 232.

At the end of the period, an account statement is generated at block 233. Referring to FIG. 6, a mock up of a typical statement 400, the statement may include information concerning the cardholder's use of the debit card during the month including, if desired, an opening balance of the financial account, a closing balance of the financial account, and the amount and the nature of the purchases made during the period. The statement may also include information regarding the reward amount previously earned, the reward redeemed during the period, the reward amount earned during the period, the reward amount currently available, and the total reward earned during the entire course of the program. It will be appreciated that additional messages may be provided on the statement. In particular, messages from the preferred retailer or the sponsor may be included to encourage the cardholder to participate in the program, may provide information about special or short term aspects of the program, or may provide information about obtaining the full benefits of the debit card.

FIGS. 7A and 7B depict the processing of the system of an aspect of the instant invention both on-line and off-line. At block 700, the debit card information and transaction data is captured. This is typically performed at the point of sale but the merchant (or the merchant is association with a card processing agent). The cardholder may be given the option of selecting whether to process the transaction as a "debit" transaction or a "credit" transaction, that is. An on-line or an off-line transaction, respectively. If the cardholder selects the on-line processing (or if this is selected automatically), the user is required to input a personal identification number (PIN) at the point of sale and the transaction data and debit card information is transferred to the transaction database 701. The transaction is reviewed by the financial institution to determine whether there are sufficient funds in the financial account (or sufficient funds in view of any overdraft protection) and if the PIN number is correct. If not, the transaction is rejected. If so, approval is granted and processing proceeds to block 702.

Certain card programs are subject to transaction handling apart from the rest of the debit card programs handled by the financial institution. At block 702, the transaction data is sorted, culling out transactions that are subject to special treatment at block 703. The transaction data for the remaining programs, including the debit card program in accord with the instant invention, proceeds to block 704. A transaction summary log is created at block 705. The transaction summary log includes the transaction data formatted for posting and analysis of various features of the data.

The transaction data in the transaction summary log is separated into data to be handled by the savings account processing system of the financial institution at block 707 and the data to be handled by the checking account processing system of the financial institution at block 706. The transaction data for the debit card system of the instant invention is preferably handled by the checking system. The separated information is transferred at block 708 for storage on the financial institution computer at block 709. This stored information related to transactions on the debit card are forwarded to the checking system of the financial institution at block 710 and formatted into useful form for further analysis. A batch file is created at block 711. Using this batch file, the checking system edits and posts all transactions—updating the various accounts at the financial institution at block 719.

If the cardholder elects to process the transaction as an off-line transaction at block 700, or if the merchant is not equipped to perform on-line transactions, the transaction data is transferred to a credit card processor at block 712. The information is then transferred to the financial institution at block 713. The financial institution sorts the transaction data into a useable format at block 714 which is forwarded at block 715 for verification at block 716. In particular, at block 716, the financial institution confirms that there are adequate funds in the financial account for the purchase and gives authorization for the purchase. This approval is transferred back to the card processor ate block 712 and the approval notice is transferred to the merchant at 700.

After approval is granted, the transaction data is transferred a second time to the card processor at block 712 (this time, for the actual purchase, not just the approval). The card processor transfers the information to the financial institution at block 713, which delivers the information to the transaction database at block 714. The financial account processing system of the financial institution then forwards the information to the appropriate subsystem within the financial institution at block 715, in this case, the checking system at the financial institution.

The transaction data of the actual purchase is matched with the transaction data which had been submitted for approval. If there is no match, the checking system retains the transaction data in a batch file for a selected period of time, such as seven days at block 718. If no match is discovered in that time, it is assumed that the transaction has not been completed. If there is a match at block 717, the checking system updates the accounts at block 719 with the transaction data.

After the accounts have been updated with the transaction data at block 719, the debit card reward processing system calculates the effect of the reward on the cardholder's financial account, as depicted in FIG. 7B. The purchases made with the debit card are identified at block 720. Data concerning all the transactions are sorted at block 721. The unique BIN number of the debit card is used to determine which transaction are related to cards other than those associated with the debit card reward program. These transactions are transferred to block 723 and handled elsewhere.

If the transaction is identified as a transaction for a debit card that is associated with the debit card reward program, the reward is calculated at block 725. As discussed above, selected parameters of the transaction data regarding each purchase made by the user are chosen as part of defining the particular program. Predetermining levels of the selected parameters are established. Information, that is, the transaction data, is captured for each purchase made by the user using the debit card. The captured information is compared to the predetermined levels at block 725 and a reward is calculated based, at least in part, on the comparison of the captured information to the predetermined levels. The calculation at block 725 relates to any reward that is uniformly applicable to any purchases made with the card. For example, if a 1% reward is generated for any purchase made with the card, it would be calculated at block 725. Thus, the selected parameter is any purchase with the debit card and the selected level is zero.

As currently preferred, an additional reward is generated for the purchase of certain goods. Thus, an additional "selected parameter" is the purchase of those particular goods. The selected level is anything above zero purchases of those goods. After calculating the reward for all purchases, the purchases of those specific goods are singled out and the additional reward applied. The user's purchases of the selected goods for the current period are compared to the selected level (in this case, zero) and a percentage of the purchases, such as 4%, is calculated as the earned reward. It will be appreciated that the selected parameters can be related to any piece of data in the transaction data. For example, the selected parameter could be the merchant, such that any purchase at that merchant would generate a reward. By way of example, the selected parameter could be the date or time of purchase, if a merchant was trying to encourage sales during a slow period. The selected parameter could be the type of goods, the location of the merchant, the manufacturer of the goods sold, the type of processing selected by the cardholder (that is, on-line versus off-line), etc. The predetermined level may by set at zero, such that any purchase having the selected parameter would meet the level, or at a higher level to encourage a certain minimum activity.

A returns of goods sold may have a negative effect on the reward. After the reward is calculated at block 725, the system determines whether there were returns such that the reward is less than zero at block 746. If the reward is less than zero, this information is transferred to the Affinity Master Update to adjust the reward point stored in that cardholder's reward account. If the reward is greater than (or equal to) zero, the transaction data related to the debit card usage is transferred to block 726. Transaction data from the participating merchant recorded at the point of purchase at block 727 is also transferred to block 726. The transaction data from the financial institution is matched to the transaction data from the merchant to determine whether any purchases were of preferred goods that would be entitled to an additional reward. Currently, debit card on-line processing systems do no record the nature of the goods sold at the point of sale and transfer this data to the financial institution with the transaction data. Consequently, it is required that the match be performed at block 726 if an additional, goods-specific reward is desired. If this information is transferred with the transaction data to the financial institution, this matching step may not be required.

If there is not a match for a purchase between the financial institution's transaction data and the merchant's transaction data, the processing proceeds to block 728. If the transaction is less then a specified number of days old, such as seven, the unmatched data is stored in an "unmatched rewards" file at block 729. As shown with respect to block 731, this unmatched transaction data is then sent back to block 726 in an attempt to match any later received merchant data.

If the transaction data is greater than a specified number of days old, no reward is calculated for this transaction and the reward process ends at block 730. A report is created at block 732 and the report is sent to the financial institution and the merchant for analysis at block 733. The merchant and the financial institution then attempt to determine why the transaction went unmatched.

If the transaction data matches at block 726, the additional reward for the matched transactions is calculated at block 734. This information is transferred to the affinity master update file at block 735 and the reward points are calculated.

The system determines whether any reward is available for this cardholder. If not, the system zeros out the reward for that period (so that the user does not get a negative reward for any returns) at block 740 and updates the affinity master file at block 735.

If a reward is available, the system determines whether any purchases are subject to the reward at block 741. As currently preferred, the reward is redeemable only by purchasing selected goods at a preferred retailer. The system determines whether the selected goods were purchased at block 741. If not, no reward will be applied and the affinity master update file is updated accordingly at block 735. If the selected goods are were purchased during the current period, the amount stored reward applicable to the purchases is posted to the financial account at block 743 and the affinity master update file is update accordingly at block 735. The checking system edits and posts the reward to the financial account at block 745. A report of the rewards earned and used during the current period is generated at block 744 and sent to the participating merchant.

The system generates statements or billing reports (see FIG. 6) on a periodic basis. Currently, it is preferred that the report be generated monthly. At block 736, the system stores cycle codes that automatically indicated that the reports should be generated, such as on the 15$^{th}$ day of the month, etc. The information required for the report is extracted from the affinity master update file and the transaction database at block 737. The reports are printed at block 738.

The present invention has been described in terms of the preferred embodiments of the invention, which are presented for purposes of illustration and not of limitation. It will be appreciated that modifications, variations, and features within the scope of the invention, given the benefit of the disclosure, will occur to one of ordinary skill in the art.

The invention claimed is:

1. A method of operating a financial service by a financial institution for a user to encourage debit card transactions consistent with a designated theme, the method comprising:
    providing a debit card to the user, wherein the debit card is associated with a financial account such that the user may use the debit card to make purchases, and an amount corresponding, at least in part, to the cost of the purchase made using the debit card is debited from the financial account;
    establishing a user reward account that is associated with the user;
    defining periods of time;
    providing a report to the user at the end of each defined period identifying, at least in part, the purchases made with the debit card during the defined period;
    designating debit card activities that are consistent with said theme, the designated debit card activities comprising purchases of a plurality of items offered by one or more providers, wherein each item comprises at least one good or service consistent with the theme, and each provider comprises at least one merchant or service provider;
    calculating a reward amount using a data processor for the user based, at least in part, on the designated debit card activities during a current period, wherein the reward amount (R) is effectively calculated as the sum of:
    (1) a first percentage ($P_1$) of the cost ($C_1$) of all purchases made by the user using the debit card, and
    (2) a second percentage ($P_2$) of the cost ($C_2$) of purchases made at the one or more providers related to said theme,
    such that $$R = \begin{cases} P_1 \times C_1 & \text{if } C_2 = 0 \\ P_1 \times C_1 + P_2 \times C_2 & \text{if } C_2 > 0 \end{cases};$$

crediting the reward amount generated during the current period to the user reward account;
    activating the user reward amount at the end of the current period;
    debiting the amount of the cost of a purchase in a subsequent period from the financial account; and
    crediting the activated user reward amount to the financial account.

2. The method of claim 1 wherein the debit card is issued by the financial institution and wherein the financial account is held by the financial institution.

3. The method of claim 1 wherein the debit card is issued by a first financial institution and wherein the financial account is held by a second financial institution.

4. The method of claim 1 further comprising storing user reward amounts for periods prior to the current period.

5. The method of claim 1 wherein the billing report at the end of the period includes a statement of the reward amount generated in periods prior to the period and not yet redeemed, the reward amount earned during the period, the reward amount redeemed during the period, and the total reward amount earned but not yet redeemed.

6. The method of claim 5 wherein the billing report further includes a statement of the total reward amount generated in all periods.

7. The method of claim 1 further comprising displaying a logo of the financial institution on the debit card.

8. The method of claim 1 further comprising displaying a logo of at least one of the one or more providers on the debit card.

9. The method of claim 1 wherein the one or more providers comprises a plurality of retailers.

10. The method of claim 1 wherein the one or more providers comprise a plurality of distinct retailers related to an entity.

11. The method of claim 10 wherein the entity has a theme and the plurality of distinct retailers market goods or services related to the theme.

12. The method of claim 10 wherein the entity is a charitable institution.

13. The method of claim 1 further comprising calculating the reward amount, at least in part, as a percentage of the cost of purchases made by the user using the debit card.

14. The method of claim 13 further comprising calculating the reward amount, at least in part, as the sum of a first percentage of the cost of purchases made by the user using the debit card up to a first level of purchases and as a second percentage of the cost of purchases made by the user using the debit card up to a second level of purchases.

15. The method of claim 1 further comprising calculating the reward amount, at least in part, as the sum of a first percentage of the cost of all purchases made by the user using the debit card up to a first level of purchases and as a second percentage of the cost of purchases made at the one or more providers by the user using the debit card up to a second level of purchases.

16. The method of claim 1 further comprising calculating the reward amount, at least in part, based on purchases of the designated items made at the one or more providers using the debit card.

17. The method of claim 1 further comprising calculating the reward amount, at least in part, as the sum of a first percentage of the cost of certain designated items purchased from the one or more providers and as a second percentage of the cost of other purchases purchased from the one or more providers.

18. The method of claim 1 wherein the reward account includes an activated component and a dormant component, and the financial account is credited for amounts up to the amount of purchases made by the user using the debit card from the activated component of the reward account up to the full amount of the active component.

19. The method of claim 1 wherein the financial account is credited from the user reward account after the financial account is debited an amount of the cost of the purchase in the subsequent period.

20. A system of reward management and tracking for a debit card reward program for a retailer in a current period, including a user having a financial account with a financial institution and a debit card issued to the user and associated with the financial account such that the financial account is debited for purchases made by the user with the debit card, the reward program being implemented to encourage debit card transactions consistent with a designated theme, the system comprising:

a computer memory means for storing data; and a computer processor operably engaged to the computer memory means, the computer processor including:

means for storing the identity of the user;

means for designating debit card activities that are consistent with said theme, the designated debit card activities comprising purchases of a plurality of items offered by one or more providers, wherein each item comprises at least one good or service consistent with the theme, and each provider comprises at least one merchant or service provider;

means for storing a reward earned by the user prior to the current period;

means for calculating the reward earned by the user based on the designated debit card activities during the current period, wherein the reward amount (R) is effectively calculated as the sum of:

(1) a first percentage ($P_1$) of the cost ($C_1$) of all purchases made by the user using the debit card, and (2) a second percentage ($P_2$) of the cost ($C_2$) of purchases made at the one or more providers related to said theme, such that $$R = \begin{cases} P_1 \times C_1 & \text{if } C_2 = 0 \\ P_1 \times C_1 + P_2 \times C_2 & \text{if } C_2 > 0 \end{cases};$$

means for activating the reward earned during the current period at the end of the current period;

means for crediting the financial account an amount corresponding to a purchase made during the current period at one or more of the plurality of providers, up to an amount equal to the reward earned by the user prior to the current period; and means for reducing the amount of the reward earned by the user prior to the current period by an amount corresponding to the amount that the financial account was credited.

21. The system of claim 20 wherein the debit card is issued by the financial institution and wherein the financial account is administered by the financial institution.

22. The system of claim 20, at least in part, wherein the debit card is issued by a first financial institution and wherein the financial account is administered by a second financial institution.

23. The system of claim 20 further comprising means for storing user reward amounts for periods prior to the current period and a means for generating a billing report at the end of the current period including a statement of the reward amount generated in periods prior to the current period and not yet redeemed, the reward amount earned during the current period, the reward amount redeemed during the current period, and the total reward amount earned but not yet redeemed.

24. The system of claim 23 wherein the billing report further includes a statement of the total reward amount generated in all periods.

25. The system of claim 20 wherein the logo of the financial institution is displayed on the debit card.

26. The system of claim 20 wherein the logo of the one or more providers is displayed on the debit card.

27. The system of claim 20 further comprising means for calculating the reward earned by the user, at least in part, as a percentage of the cost of purchases made at the one or more providers by the user using the debit card.

28. The system of claim 20 further comprising means for calculating the reward earned by the user, at least in part, as the sum of a first percentage of the cost of purchases made at the one or more providers by the user using the debit card up to a first level of purchases and as a second percentage of the cost of purchases made at the one or more providers by the user using the debit card up to a second level of purchases.

29. The system of claim 20 further comprising a means for calculating the reward earned by the user, at least in part, as the sum of a first percentage of the cost of all purchases made by the user using the debit card up to a first level of purchases and as a second percentage of the cost of purchases made at the one or more providers by the user using the debit card up to a second level of purchases.

30. The system of claim 20 further comprising means for calculating the reward earned by the user, at least in part, based on purchases of only designated items made at the one or more providers using the debit card.

31. The system of claim 20 further comprising means for calculating the reward earned by the user, at least in part, as the sum of a first percentage of the cost of certain designated items purchased from the one or more providers and as a second percentage of the cost of other purchases at one or more of the plurality of providers.

32. The system of claim 20 further comprising means for calculating the reward earned by the user, at least in part, as a fixed amount for the purchase of designated items made at the one or more using the debit card.

33. The system of claim 20 wherein the reward earned by the user includes an activated component and a dormant component, and the financial account is credited for amounts up to the amount of purchases made by the user at the one or more providers using the debit card from the activated component of the reward earned by the user up to the full amount of the active component.

34. The method of claim 33 wherein the dormant component corresponds to amount earned in a current period, and wherein the dormant component is automatically activated at the end of the current period.

35. A method of operating a debit card reward program for a user by a financial institution in cooperation with a sponsor, the reward program being implemented to encourage debit card transactions consistent with a designated theme, the method comprising:
   providing a debit card to the user, wherein the debit card is associated with a financial account such that the user may use the debit card to make purchases, and an amount corresponding, at least in part, to the cost of the purchase made using the debit card is debited from the financial account;
   establishing a user reward account that is associated with the user;
   defining periods of time;
   providing a billing report to the user at the end of each defined period identifying, at least in part, the amount of the purchases made with the debit card during the defined period;
   designating debit card activities that are consistent with said theme, the designated debit card activities comprising purchases of a plurality of items offered by one or more providers, wherein each item comprises at least one good or service consistent with the theme, and each provider comprises at least one merchant or service provider;
   calculating a reward amount using a data processor for the user based, at least in part, on the designated debit card activities during a period, wherein the reward amount (R) is effectively calculated as the sum of:
     (1) a first percentage ($P_1$) of the cost ($C_1$) of all purchases made by the user using the debit card, and
     (2) a second percentage ($P_2$) of the cost ($C_2$) of purchases made at the one or more providers related to said theme,
   such that $$R = \begin{cases} P_1 \times C_1 & \text{if } C_2 = 0 \\ P_1 \times C_1 + P_2 \times C_2 & \text{if } C_2 > 0 \end{cases};$$

crediting the reward amount generated during the period to the user reward account;
   activating the user reward amount at the end of the period;
   electing whether to provide the user reward amount to the sponsor or to the financial account;
   delivering the activated user reward amount to the sponsor when provision of the reward amount to the sponsor has been elected; and
   debiting the amount of the cost of a purchase in a subsequent period from the financial account and crediting the activated user reward amount to the financial account when provision of the reward amount to the financial account has been elected.

36. The method of claim 35 wherein the election is made by the financial institution.

37. The method of claim 36 wherein the election is made for the entire defined periods of time.

38. The method of claim 36 wherein the election is made for each period of time.

39. The method of claim 35 wherein the election is made by the user.

40. The method of claim 39 wherein the election is made once for the entire defined periods of time.

41. The method of claim 39 wherein the election is made for each period of time.

42. The method of claim 35 wherein the election is made by the sponsor.

43. The method of claim 42 wherein the election is made once for the entire defined periods of time.

44. The methods of claim 42 wherein the election is made for each period of time.

45. The method of claim 35 wherein the sponsor is a charitable institution.

46. The method of claim 35 wherein the financial account can only be accessed via non-branch channels.

47. The method of claim 35 wherein the amount credited to the reward amount is received, at least in part from the financial institution.

48. The method of claim 47 wherein the amount credited to the reward amount is received, at least in part, from the one or more providers.

49. The method of claim 35 wherein the debit card bears the logo of the sponsor.

50. The method of claim 35 further comprising providing an electronic link between web sites of the sponsor and the financial institution.

51. The method of claim 35 further comprising providing an electronic link between web sites of the one or more providers and the financial institution.

52. The method of claim 35 further comprising providing an electronic link between web sites of at least one of the one or more providers and the sponsor.

53. The method of claim 35 further comprising providing an electronic link between web sites of the financial institution, the one or more providers and the sponsor.

54. The method of claim 35 further comprising providing a discount price to selected purchases made at the one or more providers by the user using the debit card.

55. The method of claim 35 further comprising developing a program by the sponsor including discounts on selected goods purchased by the user using the debit card related to a theme consistent with the sponsor, wherein the theme is presented to the user prior to providing the debit card.

56. A method of operating a debit card reward program by a financial institution for a user to encourage debit card transactions consistent with a designated theme, the method comprising:
   providing a debit card to the user, wherein the debit card is associated with a financial account such that the user may use the debit card to make purchases at a point of sale to purchase goods, and an amount corresponding, at least in part, to the cost of the purchase made using the debit card is debited from the financial account;
   defining selected parameters of information regarding each purchase made by the user, wherein the selected parameters are related to designated debit card activities that are consistent with said theme, the designated debit card activities comprising purchases of a plurality of items offered by one or more providers, wherein each item comprises at least one good or service consistent with the theme, and each provider comprises at least one merchant or service provider;

predetermining levels of the selected parameters;

capturing information regarding each purchase made by the user including, at least in part, information concerning the selected parameters;

comparing the captured information to predetermined levels;

calculating a reward using a data processor based, at least in part, on the comparison of the captured information to the predetermined levels and the designated debit card activities, wherein the reward amount (R) is effectively calculated as the sum of:
(1) a first percentage ($P_1$) of the cost ($C_1$) of all purchases made by the user using the debit card, and
(2) a second percentage ($P_2$) of the cost ($C_2$) of purchases made at the one or more providers related to said theme, such that $$R = \begin{cases} P_1 \times C_1 & \text{if } C_2 = 0 \\ P_1 \times C_1 + P_2 \times C_2 & \text{if } C_2 > 0 \end{cases} \text{; and}$$

delivering the reward.

57. The method of claim 56 wherein the information is captured at the point of sale.

58. The method of claim 56 wherein the parameter is the identity of a merchant at which the purchase was made.

59. The method of claim 56 wherein the parameter is the identity of the items purchased.

60. The method of claim 56 wherein the parameter is a date on which the purchase was made.

61. The method of claim 56 wherein the parameter is an amount of the purchase.

62. The method of claim 56 wherein the parameter is the identity of a manufacturer who markets the items.

63. The method of claim 56 wherein defining the selected parameter comprises cooperating with a partner to select goods consistent with a theme.

64. The method of claim 56 wherein defining the selected parameter comprises cooperating with a partner to select manufacturers consistent with a theme.

65. The method of claim 56 wherein defining the selected parameter comprises cooperating with a partner to select merchants consistent with a theme.

66. The method of claim 57 wherein comparing the captured information to predetermined levels is performed on a computer of the financial institution.

67. The method of claim 57 wherein the reward is calculated when the captured information of exceeds the predetermined levels.

68. The method of claim 57 wherein the predetermined levels include a total purchase amount made with the card over a given time period.

69. The method of claim 56 wherein the predetermined level is a total purchase amount made with the debit card at a predetermined merchant over a given time period.

70. The method of claim 68 wherein the predetermined levels includes a total purchase amount of goods from a predetermined manufacturer over a given time period.

71. The method of claim 56 wherein the reward is calculated as a first percentage of all purchases made with the debit card and a second percentage of purchases of predetermined goods.

72. The method of claim 71 wherein the predetermined goods are purchased from a predetermined merchant.

73. The method of claim 56 wherein the reward is delivered to the user.

74. The method of claim 73 wherein the reward is a debit into the financial account.

75. The method of claim 56 wherein the reward is delivered to a partner.

76. The method of claim 75 wherein the reward is a debit into a financial account held by the partner.

77. The method of claim 75 wherein the selected parameters are consistent with a theme selected by the partner.

78. The method of claim 77 wherein the selected parameters are predetermined merchants.

79. The method of claim 77 wherein the selected parameters are predetermined goods.

80. A method of operating a debit card reward program by a financial institution for a user in conjunction with a theme, the method comprising:

providing a debit card to the user, wherein the debit card is associated with a financial account such that the user may use the debit card to make purchases at a point of sale to purchase goods, and an amount corresponding, at least in part, to the cost of the purchase made using the debit card is debited from the financial account;

defining a reward-generating activity in terms of selected characteristics of each purchase made by the user from the retailer using the debit card, wherein the act of defining a reward-generating activity comprises designating debit card activities that are consistent with said theme, the designated debit card activities comprising purchases of a plurality of items offered by one or more providers, wherein each item comprises at least one good or service consistent with the theme, and each provider comprises at least one merchant or service provider;

capturing transaction data regarding each purchase of one or more of the plurality of items made by the user using the debit card including, at least in part, information concerning the selected characteristics, wherein the transaction data includes transaction financial information and transaction purchase information;

wherein the transaction financial information relates, at least in part, to financial characteristics of each purchase of the one or more items made by the user using the debit card;

wherein the transaction purchase information relates, at least in part, to particular goods sold at each purchase of the one or more items made by the user using the debit card;

storing by the financial institution of transaction financial information related to each purchase of the one or more items made by the user using the debit card;

storing by the retailer of transaction purchase information related to purchase of the one or more items made by the user using the debit card;

comparing the transaction financial information and the transaction purchase information to the selected characteristics;

calculating a reward using a data processor based, at least in part, on the comparison and the designated debit card activities, wherein the reward amount (R) is effectively calculated as the sum of:

(1) a first percentage ($P_1$) of the cost ($C_1$) of all purchases made by the user using the debit card, and
(2) a second percentage ($P_2$) of the cost ($C_2$) of purchases made at the one or more providers related to said theme, such that $$R = \begin{cases} P_1 \times C_1 & \text{if } C_2 = 0 \\ P_1 \times C_1 + P_2 \times C_2 & \text{if } C_2 > 0 \end{cases};$$

and
  delivering the reward.

81. A method of operating a financial service by a financial institution for a user to encourage debit card transactions consistent with a designated theme, the method comprising:
  providing a debit card to the user, wherein the debit card is associated with a financial account such that the user may use the debit card to make purchases, and an amount corresponding, at least in part, to the cost of the purchase made using the debit card is debited from the financial account;
  establishing a user reward account that is associated with the user;
  defining periods of time;
  designating debit card activities that are consistent with said theme, the designated debit card activities comprising purchases of a plurality of items offered by one or more providers, wherein each item comprises at least one good or service, and each provider comprises at least one merchant or service provider;
  calculating a reward amount using a data processor for the user based, at least in part, on the designated debit card activities during a current period, wherein the reward amount (R) is effectively calculated as the sum of:
    (1) a first percentage ($P_1$) of the cost ($C_1$) of all purchases made by the user using the debit card, and
    (2) a second percentage ($P_2$) of the cost ($C_2$) of purchases made at the one or more providers related to said theme,
  such that $$R = \begin{cases} P_1 \times C_1 & \text{if } C_2 = 0 \\ P_1 \times C_1 + P_2 \times C_2 & \text{if } C_2 > 0 \end{cases};$$

crediting the reward amount generated during the current period to the user reward account;
  activating the user reward amount at the end of the current period;
  debiting the amount of the cost of a purchase in a subsequent period from the financial account and subsequently crediting the activated user reward amount to the financial account; and
  providing a report to the user at the end of each defined period identifying, at least part, the reward amount.

82. A method of operating a financial service by a financial institution for a user to encourage debit card transactions consistent with a designated theme, the method comprising:
  defining a thematic rewards program with designated debit card activities that are consistent with said theme, the designated debit card activities comprising purchases of a plurality of items offered by one or more providers, wherein each item comprises at least one good or service consistent with the theme, and each provider comprises at least one merchant or service provider, wherein the thematic rewards program enables a user to earn rewards in a transaction card account by using a transaction card to purchase one or more of the plurality of items from the one or more providers;
  calculating a reward amount using a data processor for a user based on the designated debit card activities, wherein the reward amount (R) is effectively calculated as the sum of:
    (1) a first percentage ($P_1$) of the cost ($C_1$) of all purchases made by the user using the debit card, and
    (2) a second percentage ($P_2$) of the cost ($C_2$) of purchases made at the one or more providers related to said theme,
  such that $$R = \begin{cases} P_1 \times C_1 & \text{if } C_2 = 0 \\ P_1 \times C_1 + P_2 \times C_2 & \text{if } C_2 > 0 \end{cases};$$

and
  delivering the reward amount.

83. The method of claim 82, wherein the plurality of items have a common theme.

84. The method of claim 82, wherein the act of defining the thematic rewards program comprises:
  receiving a designation of the plurality of items, the designation of the plurality of items being consistent with a theme associated with the thematic rewards program.

85. The method of claim 82, further comprising:
  after the act of delivering, receiving a designation of one or more products having an enhanced reward-earning feature, wherein the user may earn rewards at an increased rate by using the transaction card to purchase the designated one or more products.

86. The method of claim 85, wherein the designation of one or more products is received from the one or more providers.

87. The method of claim 86, wherein the plurality of items comprise products and services that can improve a user's health.

88. The method of claim 82, wherein the act of delivering the reward amount comprises:
  crediting the reward amount to the financial account.

89. The method of claim 82, wherein the act of delivering reward amount comprises:
  crediting the reward amount to a company sponsor associated with the thematic rewards program.

90. The method of claim 82, wherein the act of delivering the reward amount comprises:
  delivering the reward to the user based on one or more subsequent purchases of one or more of the plurality of items.

91. The method of claim 82, wherein the act of delivering the reward amount comprises:
  delivering the reward to the user as a rebate on one or more subsequent purchases using the transaction card.

92. The method of claim 82, wherein the act of delivering the reward amount comprises:
  activating the reward amount in the rewards account as a rebate on one or more subsequent purchases of one or more of the plurality of items.

93. The method of claim 82, wherein the rewards program further enables the user to earn rewards based on whether a purchase using the transaction card was processed over an on-line network or an off-line network.

94. The method of claim 82, further comprising:
prompting the user to input a personal identification number prior to at least one of the purchases.

95. The method of claim 82, further comprising:
providing an electronic link between one or more websites of the one or more providers with a website of the financial institution.

96. The method of claim 82, wherein the act of calculating the reward amount is further based on a determination of whether a purchase transaction of the transaction card was processed over a credit network.

97. The method of claim 82, wherein the act of calculating the reward amount is further based on the time at which a purchase transaction of the transaction card occurred.

98. The method of claim 82, wherein the act of calculating the reward amount is further based on whether a purchase transaction of the transaction card is above a predetermined amount.

99. The method of claim 82, wherein the transaction card comprises a debit card.

100. The method of claim 82, wherein the act of defining a thematic rewards program comprises selecting at least one of goods, manufacturers, and merchants consistent with a theme, wherein the plurality of items are thematically associated with the theme.

101. The method of claim 82, further comprising:

establishing a discount on purchases of products or services that are consistent with the theme pursuant to the thematic rewards program.

\* \* \* \* \*